No. 742,855. PATENTED NOV. 3, 1903.
J. C. GARRETT.
HOSE SUPPORT.
APPLICATION FILED MAR. 5, 1903.
NO MODEL.
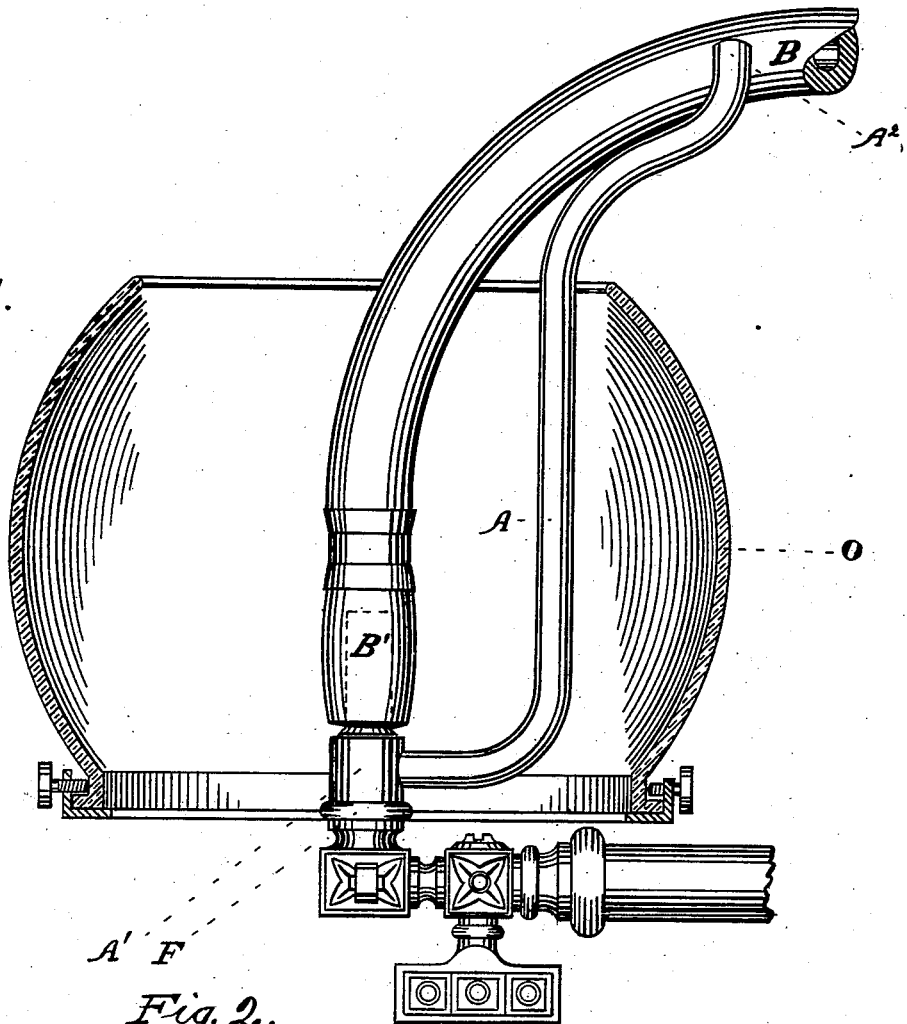
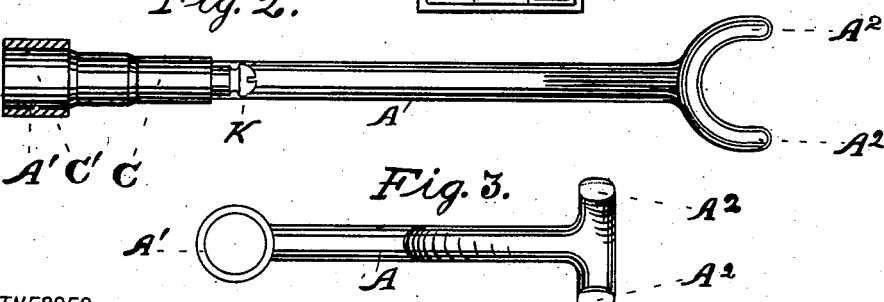
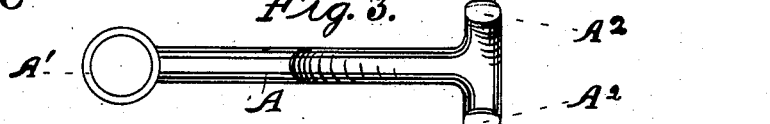
WITNESSES:
P. W. J. Lander,
Thos. E. Connolly
INVENTOR
James C. Garrett.

No. 742,855.

Patented November 3, 1903.

UNITED STATES PATENT OFFICE.

JAMES C. GARRETT, OF SAN FRANCISCO, CALIFORNIA.

HOSE-SUPPORT.

SPECIFICATION forming part of Letters Patent No. 742,855, dated November 3, 1903.

Application filed March 5, 1903. Serial No. 146,423. (No model.)

*To all whom it may concern:*

Be it known that I, JAMES C. GARRETT, a citizen of the United States, residing at San Francisco, in the county of San Francisco, State of California, have invented a new and useful Improvement in Hose-Supports, which improvement is fully set forth in the following specification and shown in the accompanying drawings.

My invention relates to hose-supports, and has for its object to eliminate the inconveniences and prevent the wear on the flexible attaching end of the hose when it is attached to an ordinary gas-fixture when used for conveying gas from a chandelier to a student-lamp, heater, or other use for which gas may be required. It is well known that nearly all such hose is made with flexible rubber ends, and when the hose is attached to the ordinary gas-fixture the weight of the hose causes a lateral strain on this rubber end, which soon spreads the rubber, destroying the hose and rendering it useless to prevent the escape of gas, and, further, it is impracticable to attach such a hose to a gas-fixture on which a globe is mounted without removing the globe to prevent the liability of breaking it by violent contact with the hose. To remedy these undesirable features in the use of hose when attached to an ordinary gas-fixture, I have devised my hose-support, which will be effective in eliminating the inconveniences set forth and may be produced at a comparatively small cost.

To these ends my invention consists of the construction and combination hereinafter described in the specification, illustrated in the drawings, and incorporated in the claims hereto appended.

Similar letters designate corresponding parts in the various views.

Referring to the drawings, Figure 1 shows an ordinary chandelier having the tip K removed from the burner-tube C and the hose B attached to the tube C and in position in its seat in the upper end of my improved support A. Fig. 2 is a view of the support with the attaching-band sectioned, showing its position on the collar of the tube C, its location in relation to the burner or tip, and the seat for supporting the hose. Fig. 3 is a plan view of the support, showing the band on the attaching end of the support and the seat for the hose.

The support A is constructed out of any suitable material. Fig. 1 of the drawings shows my support in position on the gas-fixture. Its attaching end is constructed with a band A', which is made to fit neatly around the collar C' of the tube C. As is well known, this tube C is provided with a threaded collar C', adapted to be secured onto the vertical elevation F of the gas-fixture, its upper end forming a receptacle for the gas tip or burner K, thus giving a rigid bearing to the support A. At a suitable distance horizontally, as shown in Fig. 1, the stem of the support is bent to a vertical position, extending upward a sufficient distance to avoid contact with the globe O. It is then bent horizontally sufficient to permit a gradual curve for the hose B and is provided with two spreading upturned arms $A^2$, forming a close-fitting seat for the hose, and is adapted to swing or pivot around the burner in whatever direction the hose may lead.

As shown in Fig. 1, the attaching rubber end B' of the hose B is in position on the tube C of the gas-fixture, and by reason of fitting neatly between the upturned ends $A^2$ of the support A it will retain its position firmly on the tube C.

Having now, it is believed, sufficiently described my invention, what I claim as new, and desire to secure by Letters Patent, is—

1. In a support for gas-hose, a bent rod having a band or collar adapted to fit and swivel on the vertical portion of a gas-burner below the point of attachment of the hose, and having an upward and outward curve with upwardly-projecting arms, forming a channel adapted to maintain a hose in a gradual curved position.

2. In a support for a gas-hose, a bent rod having a band or collar adapted to fit and swivel on the lower portion of a gas-burner below the point of attachment of the hose and having an upward and outward curve, with means for holding the hose in position on the support.

3. In a support for a gas-hose, a bent rod having means on one end adapted to fit and swivel on a gas-burner below the point of attachment of the hose and having an upward and outward curve, and having on its other end means for holding and retaining a hose in position.

JAMES C. GARRETT.

Witnesses:
P. W. J. LANDER,
JOHN RICHARDS.